Aug. 22, 1939.                    J. A. FITCH                    2,170,472
METHOD OF ATTACHING NUTS TO METAL PLATES OR SIMILAR ARTICLES OR MEMBERS
Filed Sept. 10, 1937
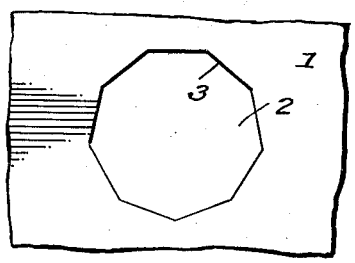
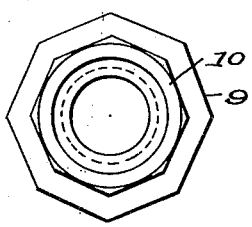
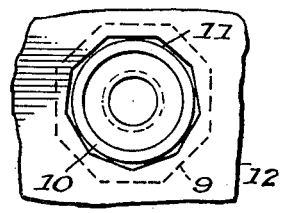
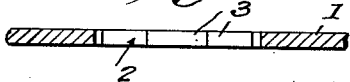
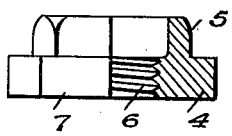
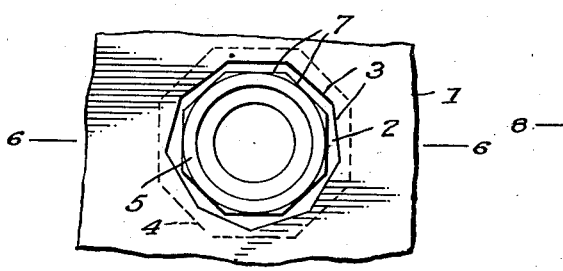
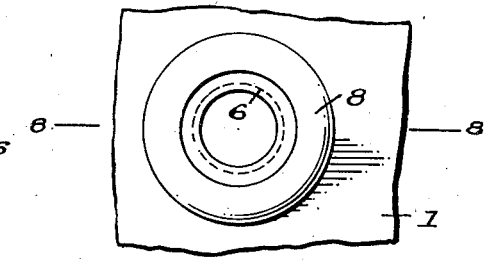
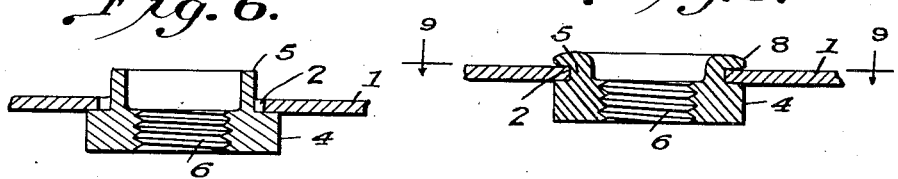
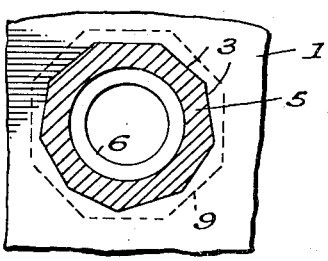
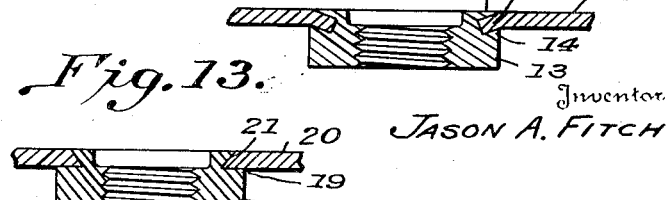
Inventor
JASON A. FITCH
By Milano & Milano
Attorneys Patented Aug. 22, 1939

2,170,472

UNITED STATES PATENT OFFICE 2,170,472

METHOD OF ATTACHING NUTS TO METAL PLATES OR SIMILAR ARTICLES OR MEMBERS

Jason A. Fitch, Youngstown, Ohio

Application September 10, 1937, Serial No. 163,309

2 Claims. (Cl. 29—148)

My invention relates to new and useful improvements in a method of attaching nuts to metal plates or similar articles or members and the principal object of the invention resides in a method of attaching a nut of the clincher type to a plate or similar article or member so that the nut will not rotate relative to said plate or other article or member to which it is attached.

In carrying out my invention the plate or other article or member, to which it is to be attached, is provided with an opening to receive a shank portion of the nut, the smallest diameter of the opening being greater than the largest exterior diameter of the shank of the nut. Preferably the opening in the plate or similar member will be of irregular formation as will also be the shank of the nut, the opening preferably being formed with one more side or face than is the shank of the nut. In other words as an example there will be a nine-sided opening in the plate or other member while the shank of the nut will be of only eight sides. Of course, this is only used as an example and the opening and shank may be of the desired shape with the opening provided with one more side or face than the shank of the nut. With the opening and nut so formed the shank of the nut may be readily placed into the opening of the plate or other member and, if desired, rotated relative thereto but there will be a relatively small space between the shank of the nut and the wall of the opening so that when the shank of the nut is expanded for clinching the metal will readily flow into engagement with the wall of the opening and such wall being of irregular shape or formation there will be such a contact between the expanded shank and the wall of the opening as will prevent rotation of the nut relative to the plate or other member to which it is secured.

With the above and other objects in view, which will appear as the description proceeds, my invention consists in the novel method which will be herein described and claimed and it will be understood that such changes may be made as will fall within the scope of the appended claims.

In the drawing:

Fig. 1 is a plan showing a nine-sided opening in a plate to which the nut is to be attached.

Fig. 2 is a plan of the nut looking at that side having the shank projecting therefrom.

Fig. 3 is a longitudinal vertical section through the plate with the wall of the opening shown in elevation.

Fig. 4 is a side elevation of the nut with parts in transverse vertical section.

Fig. 5 is a plan view showing the nut in position relative to the plate with the shank of the nut projecting into the opening of the plate.

Fig. 6 is a longitudinal vertical section on the line 6—6 of Fig. 5.

Fig. 7 is a top plan showing the nut secured to the plate, the shank of the nut having been turned over into clinching engagement with the plate.

Fig. 8 is a longitudinal vertical section on the line 8—8 of Fig. 7.

Fig. 9 is a horizontal section on the line 9—9 of Fig. 8.

Fig. 10 is a side elevation of a nut having a round shank portion.

Fig. 11 is a top plan showing the form of nut illustrated in Fig. 10 with the shank portion projecting into the nine-sided opening of a plate.

Figs. 12 and 13 are longitudinal vertical sections showing slightly modified forms of nuts and plates in which my improved method is carried forward.

In the drawing 1 indicates the plate to which the nut is adapted to be secured, this plate being provided with the opening 2 having the nine sides or faces indicated at 3. The nut is indicated at 4 and has the eight-sided shank 5 projecting from one face thereof, the nut being provided with the usual threaded opening 6, as shown more particularly in Fig. 4 of the drawing. The eight sides or faces of the nut are indicated at 7 and as shown more particularly in Figs. 5 and 6 of the drawing the shank 5 of the nut is adapted to be positioned in the opening 2 and projects therethrough, the body portion of the nut being of greater diameter than the opening as is shown in Fig. 6 of the drawing and by dotted lines in Fig. 5. When the nut is to be positioned relative to the plate or other member the shank of the nut will be inserted into and through the opening of the plate and said shank of the nut being of one less side or face than the opening the nut may be readily positioned in any position of rotation and may be rotated at will. It will be noted that with the nut positioned as shown more particularly in Fig. 5 of the drawing there is only one face or side of the nut shank which is parallel with a side or face of the opening in the plate and as shown the points between the faces or sides of the nut shank will be directed to different positions relative to the sides or faces of the opening. By this arrangement no matter in what position the nut is placed relative to the plate with the shank projecting into the opening the nut may be rotated relative to the plate but there is a relatively small space between the faces of the nut shank and the wall of the opening so that when the shank is expanded during clinching the metal of the shank will readily flow to contact the faces of the opening as shown more particularly in Fig. 9 of the drawing to provide a secure hold or clinch between the nut and plate and to prevent rotation of the nut, when so clinched, relative to the plate. During the clinching operation the metal will also expand or roll over the opposite face of the plate or similar member to provide the overlying flange 8 as shown more particularly in Figs. 7 and 8 of the drawing. I lay particular advantage on this method of attaching the nut to the plate for it will be readily appreciated that if the shank of the nut was provided with the same number of sides or faces as is the wall of the opening then the nut would have to be positioned at a particular point of rotation relative to the plate to permit the insertion of the shank of the nut into the opening. Of course, it might be said that if the diameter or circumference of the shank was sufficiently reduced that it might readily be inserted into the opening in any position of rotation of the nut relative to the plate, but if this was done the space between the shank of the nut and the wall of the opening in the plate would be so great that in the clinching operation the metal of the shank would not so readily flow for contact with the wall of the opening. In the formation which I have shown in Figs. 1 to 9 of the drawing the faces or sides of the shank are so positioned relative to the sides or faces of the wall of the opening that when the clinching operation is taking place the metal of the shank may readily flow into contact with the sides or faces of the wall of the opening.

In Fig. 10 of the drawing I have shown a nut 9 having a round shank 10 adapted to be used in carrying forward my method and as shown more particularly in Fig. 11 of the drawing the round shank 10 is adapted to be positioned in a nine-sided opening 11 formed in the plate 12. It will be seen that the nut may be readily positioned relative to the plate and the shank 10 passed through the opening 11, the shank being of such a diameter that it may be rotated in the opening. The shank 10 is adapted to be expanded in a clinching operation and when so expanded the metal will flow to fill the opening 11 and to contact with the nine sides or faces of said opening the same as is shown in Fig. 9 of the drawing. Of course, in this operation the shank will also be expanded to provide an overlying flange similar to the flange 8, said flange being positioned on the face of the plate or similar member opposite to that engaged by the body portion of the nut.

In Fig. 12 of the drawing I have illustrated a nut 13 having a beveled seat 14, against which the edge 15 of the plate 16 is adapted to be forced when the shank of the nut is expanded for clinching purposes and in this form of the invention it will be noted that when the shank of the nut is expanded an overhanging flange 17 will be provided and the outer surface of this flange will be flush with the face of the plate 16.

In Fig. 13 of the drawing I have shown a nut 18 provided with the flat seat 19, against which one face of the plate 20 bears, and the opening in the plate 20 is formed with the beveled edge 21 engaged by the metal of the shank in the nut when the same is expanded into clinching engagement. In this form of the invention it will be noted that when the metal of the shank is expanded the outer face of the expanded shank will lie flush with the face of the plate 20.

It will be understood that in connection with Figs. 12 and 13 of the drawing that before expansion the shank of the nut will be of the irregular shape such as is shown in Figs. 2 and 5 of the drawing and the openings in the plate 16 and 20 will also be of irregular shape as is the opening 2 shown in Fig. 1.

From the above detailed description it is thought that my improved method of attaching the nut to the plate or similar member will be clearly understood. Attention is directed to the fact that in carrying forward the method the shank of the nut may be positioned in the opening of the plate or similar member without the necessity of aligning surfaces or faces.

Having fully described my invention what I claim as new and desire to secure by Letters Patent is:—

1. The method of attaching a nut to a plate-like object which consists in positioning an irregularly-shaped shank of a nut in an irregularly-shaped opening in the object and then spreading the shank to flow the metal thereof into contact with the edges of the opening in the object, the largest exterior diameter of the irregularly-shaped shank being less than the smallest diameter of the irregularly-shaped opening to permit rotation of the nut relative to the object prior to spreading of the shank.

2. The method of attaching a nut to a plate-like object which consists in positioning an irregularly-shaped shank of a nut in an irregularly-shaped opening in the object, the shank of the nut having one less side than the opening in the object and the largest exterior diameter of the shank being less than the smallest diameter of the irregularly-shaped opening to normally permit rotation thereof in the opening, not more than one side of the shank of the nut normally extending truly parallel with a side of the opening, and then spreading the shank to flow the metal thereof into contact with the edges of the opening in the object.

JASON A. FITCH.